(12) United States Patent
Seibert et al.

(10) Patent No.: US 9,227,661 B2
(45) Date of Patent: Jan. 5, 2016

(54) LENGTH ADJUSTER AND CLAMPING MECHANISM FOR A STEERING MECHANISM

(71) Applicant: Federal-Mogul Motorparts Corporation, Southfield, MI (US)

(72) Inventors: Trevor G. Seibert, Millstadt, IL (US); Theodore Cosgrove, St. Louis, MO (US)

(73) Assignee: Federal-Mogul Motorparts Corporation, Southfield, MI (US)

(*) Notice: Subject to any disclaimer, the term of this patent is extended or adjusted under 35 U.S.C. 154(b) by 0 days.

(21) Appl. No.: 14/576,472

(22) Filed: Dec. 19, 2014

(65) Prior Publication Data

US 2015/0175200 A1 Jun. 25, 2015

Related U.S. Application Data

(60) Provisional application No. 61/918,200, filed on Dec. 19, 2013.

(51) Int. Cl.
| | |
|---|---|
| *B62D 7/16* | (2006.01) |
| *F16C 7/06* | (2006.01) |
| *B62D 7/20* | (2006.01) |
| *F16B 39/02* | (2006.01) |

(52) U.S. Cl.
CPC *B62D 7/163* (2013.01); *B62D 7/16* (2013.01); *B62D 7/20* (2013.01); *F16B 39/028* (2013.01); *F16C 7/06* (2013.01)

(58) Field of Classification Search
CPC ............ B62D 7/163; B62D 7/20; B62D 7/16; F16B 39/028; F16C 7/06

USPC .............................. 280/93.51, 93.514, 93.515
See application file for complete search history.

(56) References Cited

U.S. PATENT DOCUMENTS

| | | | |
|---|---|---|---|
| 1,742,782 A | 1/1930 | Parker | |
| 1,910,926 A * | 5/1933 | Lutz | ............................ 403/127 |

(Continued)

FOREIGN PATENT DOCUMENTS

| | | |
|---|---|---|
| CN | 102320327 A | 1/2012 |
| DE | 20116636 U1 | 2/2002 |
| WO | WO 2012081800 A1 * | 6/2012 ............... F16C 7/06 |

OTHER PUBLICATIONS

International Search Report, mailed Mar. 26, 2015 (PCT/US2014/071383).

*Primary Examiner* — Faye M Fleming
(74) *Attorney, Agent, or Firm* — Robert L. Stearns; Dickinson Wright, PLLC

(57) ABSTRACT

The steering mechanism includes a center link which extends between opposite longitudinal ends. Each end has a bore with threads which are spaced from the end by an unthreaded portion. A tie rod includes a bore with threads that are spaced form an end of the tie rod by an unthreaded portion. A length adjuster threadedly connects one of the longitudinal ends of the center link with the tie rod. The length adjuster includes threaded sections and an unthreaded middle section. The unthreaded middle section overlaps with the unthreaded portions of the center link and tie rod bores respectively. A first clamp is clamped around the overlapping unthreaded portion of the center link bore and the unthreaded middle section of the length adjuster, and a second clamp is clamped around the overlapping unthreaded portion of the tie rod bore and the unthreaded middle section of the length adjuster.

15 Claims, 6 Drawing Sheets

(56) References Cited

U.S. PATENT DOCUMENTS

| | | | |
|---|---|---|---|
| 1,985,728 A * | 12/1934 | Ingersoll | 403/136 |
| 2,533,894 A | 12/1950 | Podell | |
| 2,723,140 A * | 11/1955 | Graham | 403/290 |
| 3,013,437 A | 12/1961 | Harding | |
| 3,498,652 A * | 3/1970 | Cass | 403/43 |
| 3,938,822 A * | 2/1976 | Guerriero | 280/86.758 |
| 4,614,451 A | 9/1986 | Braisted, Jr. | |
| 4,902,158 A * | 2/1990 | Broszat et al. | 403/77 |
| 5,443,564 A | 8/1995 | Reaves | |
| 5,533,580 A | 7/1996 | Reaves | |
| 5,603,583 A * | 2/1997 | Jackson | 403/320 |
| 5,765,844 A | 6/1998 | Wood | |
| 6,039,334 A | 3/2000 | Ozeki | |
| 8,770,602 B1 * | 7/2014 | Belleau | 280/93.51 |
| 2005/0201821 A1 * | 9/2005 | Irrer | 403/43 |
| 2010/0314510 A1 | 12/2010 | Munn et al. | |
| 2012/0003032 A1 * | 1/2012 | Rump et al. | 403/44 |
| 2012/0104716 A1 * | 5/2012 | Hintzen | 280/124.135 |

* cited by examiner

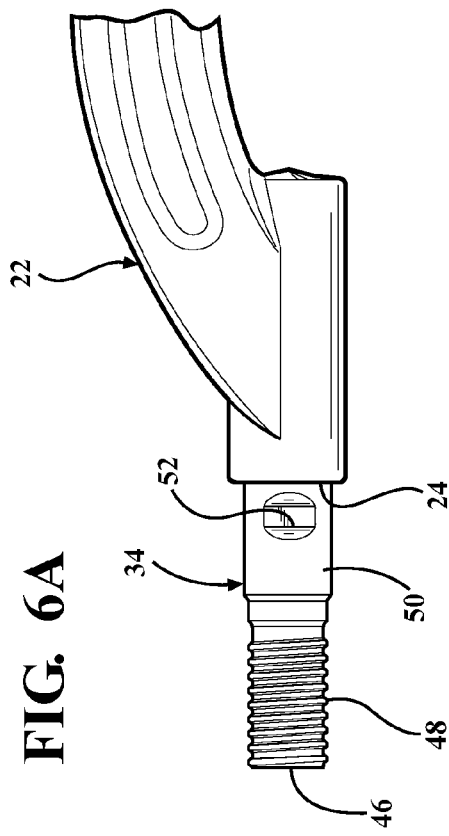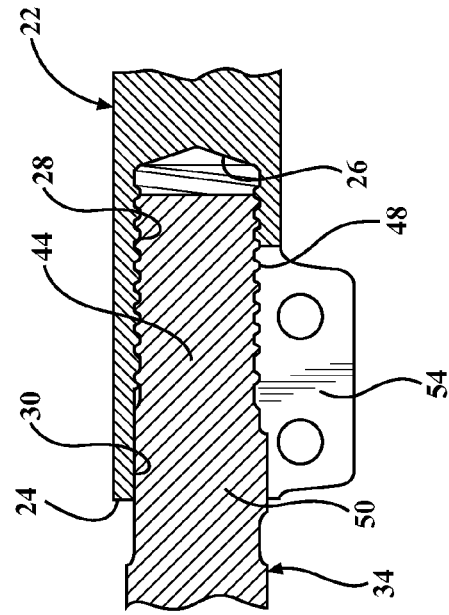
FIG. 5A  FIG. 5B
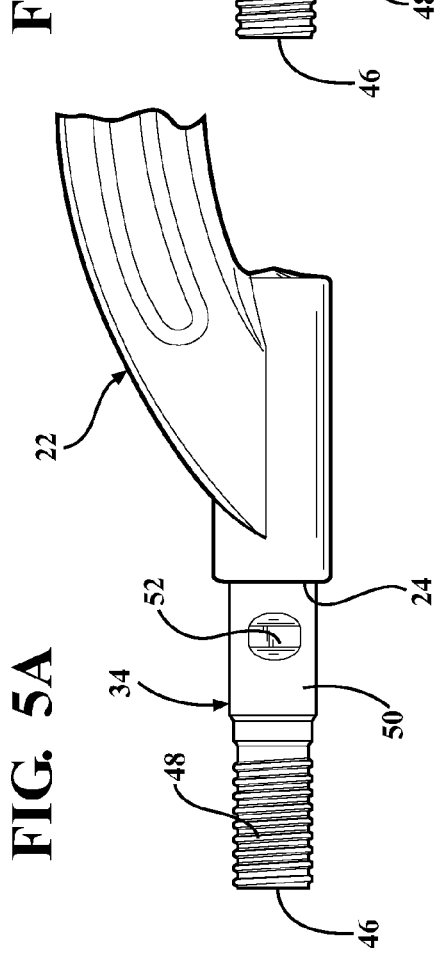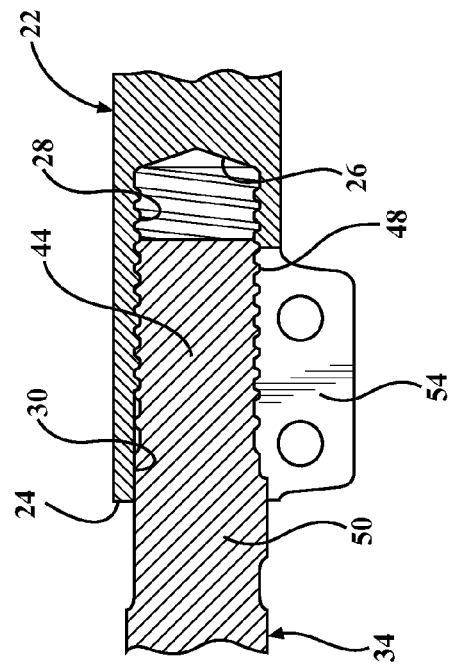
FIG. 6A  FIG. 6B

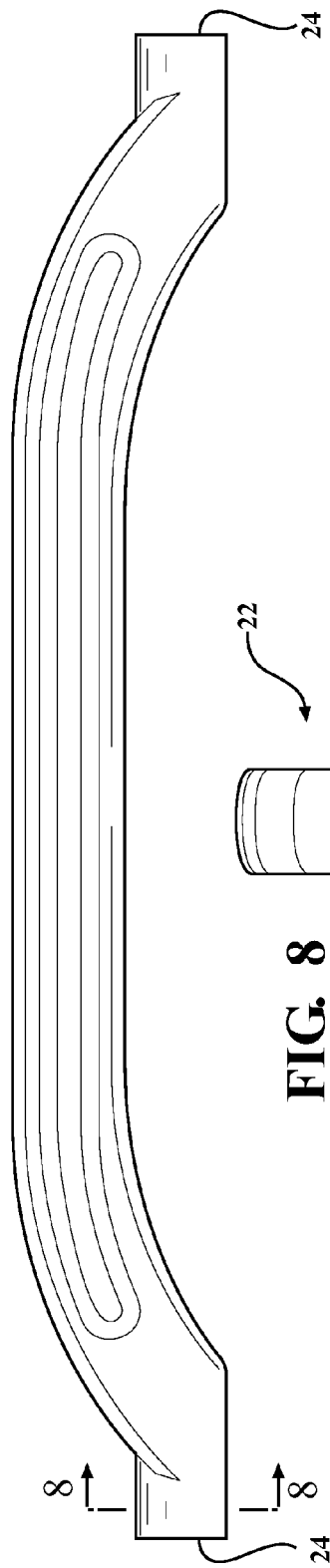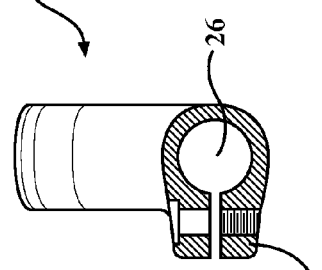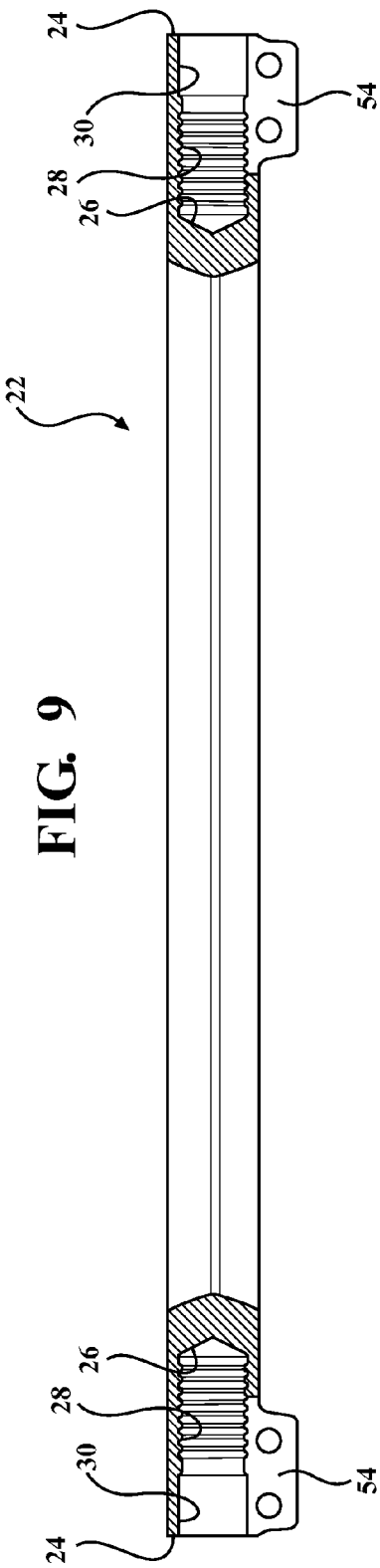

LENGTH ADJUSTER AND CLAMPING MECHANISM FOR A STEERING MECHANISM

CROSS-REFERENCE TO RELATED APPLICATION

This application claims the benefit of U.S. Provisional Patent Application Ser. No. 61/918,200, filed Dec. 19, 2013, entitled "Length Adjuster and Clamping Mechanism", the entire disclosure of the application being considered part of the disclosure of this application and hereby incorporated by reference.

BACKGROUND OF THE INVENTION

1. Field of the Invention

The present invention is related to length adjusting mechanisms for the steering systems of vehicles where bending or buckling loads may be applied to an adjusting mechanism.

2. Related Art

Recirculating ball steering mechanisms are found in many types of passenger vehicles as well as heavy equipment vehicles including, for example, tractors. Such steering mechanisms typically include a single center link and a pair of tie rods. The tie rods are joined with steering knuckles of the vehicle's front wheels and the center link is moveable back and forth in a lateral direction for pushing and pulling on the tie rods to turn the front wheels. The tie rods are joined with opposite ends of the center link.

Typically, components such as center links and tie rods are provided with male and female threaded unions. Threads may be of either type on either component but always in mating male/female configurations for adjustment. During assembly, opposite thread types are threaded together to a predetermined distance, and then a clamping mechanism is engaged around the outside diameter of the component having female threads. The clamping mechanism is then tightened to secure the threaded union. Often, the male threads extend beyond the female threads of the mating component after the clamping mechanism is secured.

SUMMARY OF THE INVENTION AND ADVANTAGES

One aspect of the present invention provides for a steering mechanism for a vehicle. The steering mechanism includes a center link which extends between opposite longitudinal ends. Each of the longitudinal ends has a center link bore with female threads that are spaced from the longitudinal ends by center link unthreaded portions. The steering mechanism further includes at least one tie rod with a tie rod end and a tie rod bore with female threads that are spaced from the tie rod end by a tie rod unthreaded portion. At least one length adjuster is further provided for interconnecting and selectively separating and bringing together the center link and the tie rod. The length adjuster includes first and second threaded sections with male threads and an unthreaded middle section. The first threaded section of the length adjuster is threadedly engaged with the center link bore of the center link with the center link unthreaded portion overlapping with the unthreaded middle section of the length adjuster. Additionally, the second threaded section of the length adjuster is threadedly engaged with the tie rod bore with the tie rod unthreaded portion overlapping with the unthread middle section of the length adjuster. A first clamp is clamped at least partially about the overlapping center link unthreaded portion and the unthreaded middle section of the length adjuster, and a second clamp is clamped at least partially about the overlapping tie rod unthreaded portion and the unthreaded middle section of the length adjuster.

The improved steering mechanism exhibits improved life and durability as compared to other known steering mechanisms because the bending and buckling loads are transferred through the overlapping unthreaded areas rather than through the threads as is common in other known steering mechanisms.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIGS. 5A and 5B show the length adjuster threaded to a second position that is different than the first position within the center link;

FIGS. 6A and 6B show the length adjuster threaded to a third position that is different than the first and second positions within the center link;

FIG. 7 is a front elevation view of the exemplary center link;

FIG. 8 is a cross-sectional view of the center link taken through Line 8-8 of FIG. 7;

FIG. 9 is another cross-sectional view of the center link taken from a different perspective than FIG. 8;

DESCRIPTION OF THE ENABLING EMBODIMENT

Figure 1:
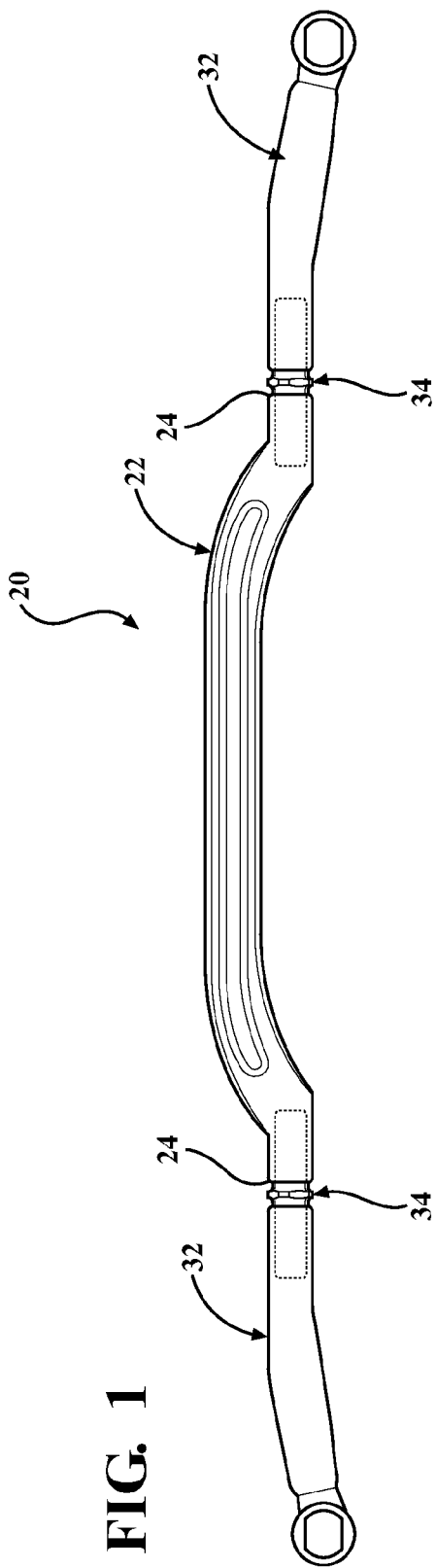
FIG. 1 is a front elevation view of an exemplary embodiment of a steering mechanism assembly.

Referring to the Figures, wherein like numerals indicate corresponding parts throughout the several views, an exemplary embodiment of an improved steering mechanism 20 for a vehicle, such as an automobile, is generally shown in FIG. 1. The steering mechanism 20 is advantageous because it may be quickly and simply elongated while allowing a bent configuration to be utilized for clearance around other chassis components, yet remain structurally sound in the threaded regions when this length adjuster mechanism is incorporated and clamped as described herein. The steering mechanism 20 may find uses in a wide range of vehicles including, for example, passenger vehicles, tractors, trucks, heavy-duty machinery, harvesters, etc.

The exemplary steering mechanism assembly 20 includes a single center link 22 which extends in a longitudinal direction between opposite longitudinal ends 24. As shown in FIG.

9, at each of the longitudinal ends 24, the center link 22 is provided with a center link bore 26 which extends into the center link 22 and has female threads 28. As shown, the female threads 28 are spaced from the longitudinal ends 24 of the center link 22 by unthreaded portions 30. The center link 22 is preferably formed as one integral piece of metal and may be shaped through any suitable process.

Referring back to FIG. 1, the steering mechanism further includes a pair of tie rods 32 and a pair of length adjusters 34 which interconnect the tie rods 32 with the opposite longitudinal ends 24 of the center link 22. During assembly of the steering mechanism 20, the length adjusters 34 allow for precise positioning of the tie rods 32 relative to the center link 22 by allowing the center link 22 and the tie rods 32 to be controllably separated or brought closer together. During operation of the vehicle, the center link 22 is configured to push and pull on the tie rods 32 to rotate the steering knuckles (not shown) and the front wheels (not shown) of the vehicle.

Figure 3:
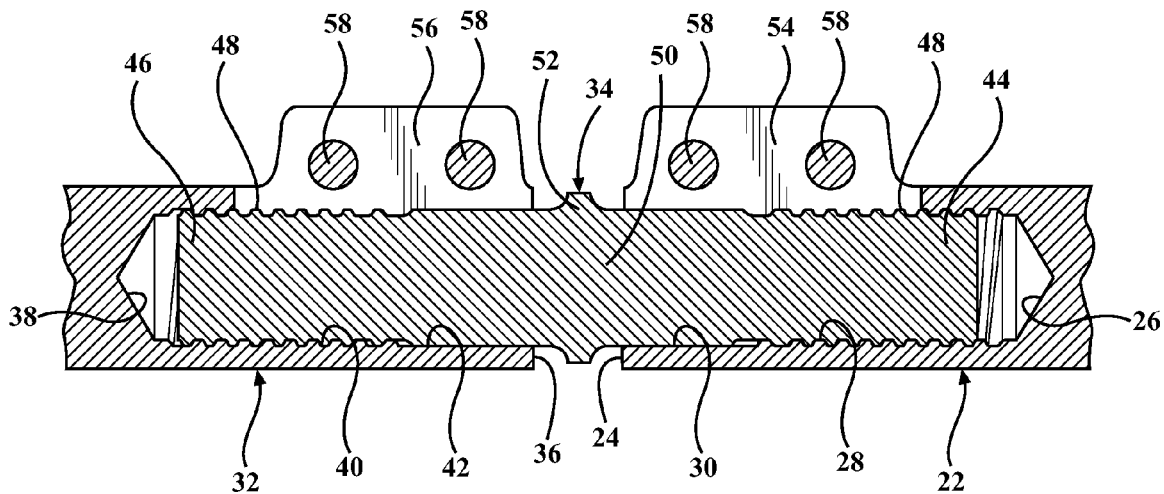
FIG. 3 is a cross-sectional view of FIG. 2.
Figure 11:
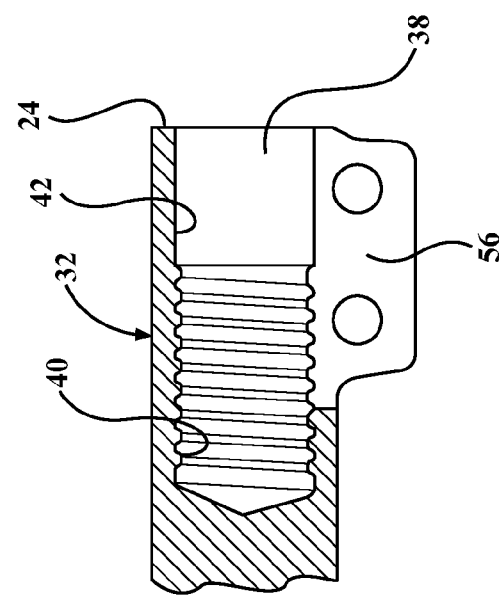
FIG. 11 is a cross-sectional and fragmentary view of the exemplary tie rod of FIG. 10.

Referring now to FIGS. 3 and 11, each of the tie rods 32 includes a tie rod end 36 with a tie rod bore 38 formed therein. Similar to the center link bores 26 discussed above, each tie rod bore 38 is provided with female threads 40 which are spaced from the respective tie rod end 36 by unthreaded portions 42.

Figure 13:
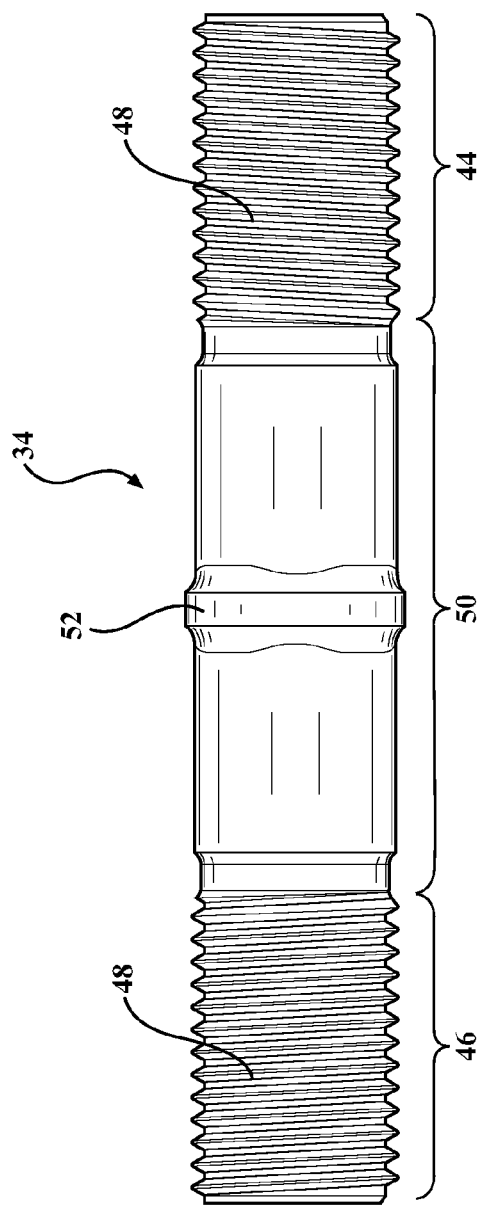
FIG. 13 is a front elevation view of the exemplary length adjuster.
Figure 14:
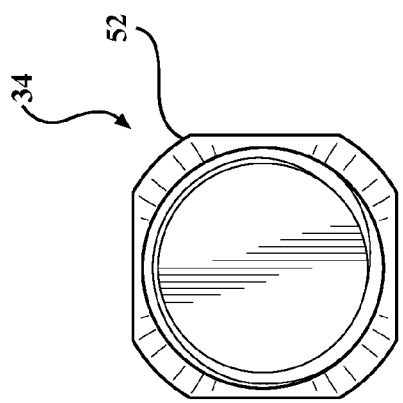
FIG. 14 is a side elevation view of the exemplary length adjuster.

Referring now to FIG. 13, the exemplary embodiment of the length adjuster 34 is generally symmetrical and includes a first and second threaded sections 44, 46 that are minor images of one another and include male threads 48. The length adjuster 34 is also provided with an unthreaded middle section 50 which extends between said first and second threaded sections 44, 46. The unthreaded middle section 50 of the length adjuster 34 is provided with a tool receiving feature 52 for rotating the length adjuster 34 relative to the center link 22 and the tie rods 32. The tool receiving feature 52 could be, for example, generally square or hexagonally shaped for receiving an open ended wrench. However, it should be appreciated that the tool receiving region could have any suitable or configuration for receiving any suitable type of tool to rotate the length adjuster 34.

Referring back to FIG. 3, the first threaded section 44 of the length adjuster 34 is threadedly engaged with the center link bore 26 to interconnect the length adjuster 34 with the center link 22, and the second threaded section 46 of the length adjuster 34 is threadedly engaged with the tie rod bore 38 to threadedly interconnect the length adjuster 34 with the tie rod 32. As shown, the unthreaded portions 30, 42 of the center link 22 and the tie rod 32 overlap with the unthreaded middle section 50 of the length adjuster 34.

Figure 4A:
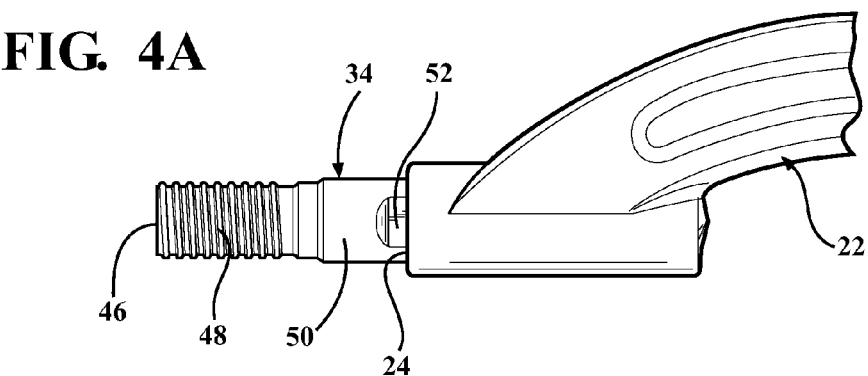
FIGS. 4A and 4B show the length adjuster threaded to a first position within the center link.
Figure 4B:
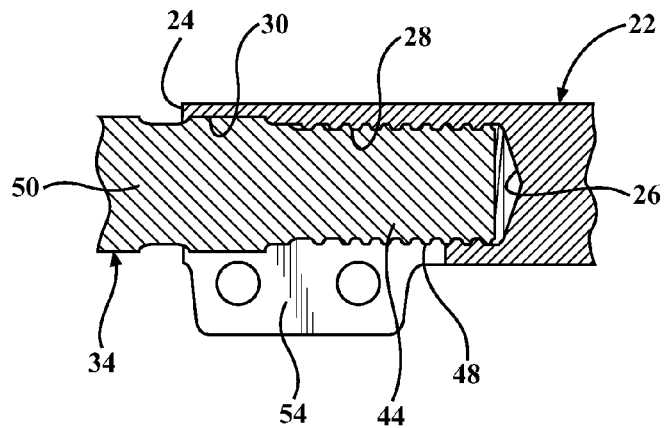
Figure 10:
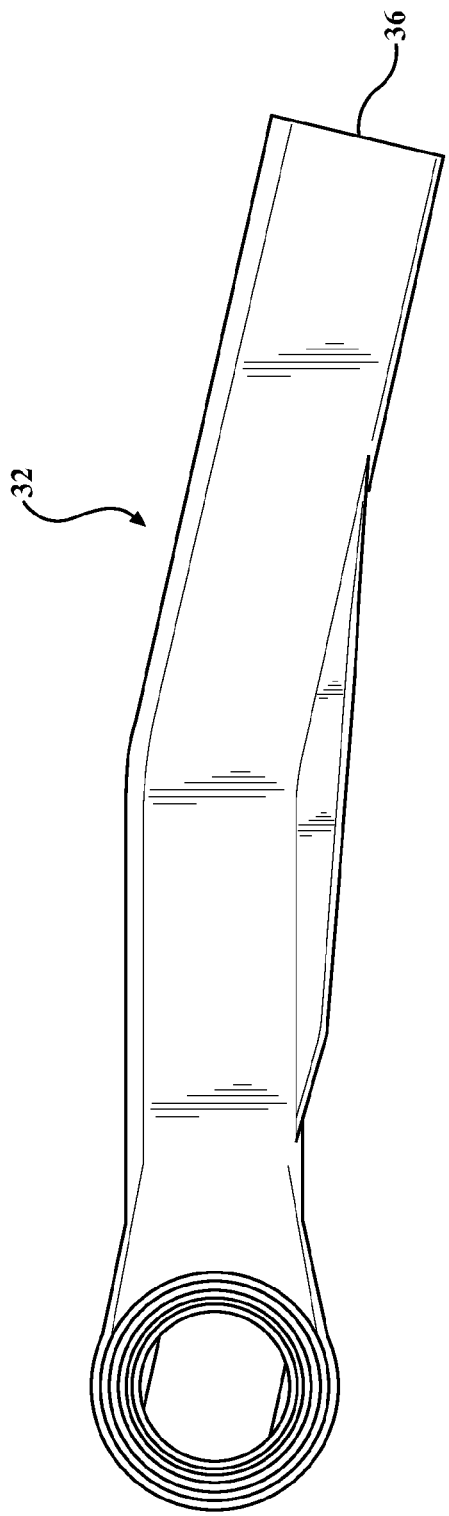
FIG. 10 is a top elevation view of the exemplary tie rod.
Figure 12:
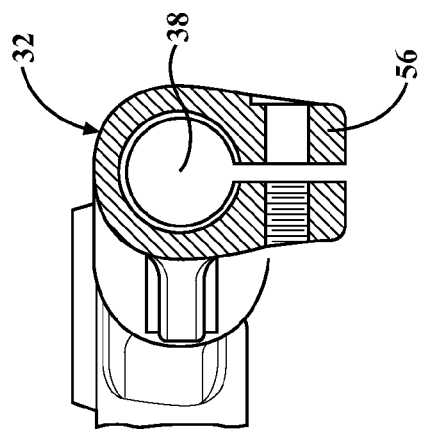
FIG. 12 is another cross-sectional view of the exemplary tie rod taken from a different perspective than FIG. 11.

Preferably, the female threads 40 of the tie rod bores 38 extend in opposite rotational directions from the female threads 28 of the center link bores 26, and the male threads 48 on the opposite first and second threaded sections 44, 46 of the length adjuster 34 extend in opposite rotational directions. This particular configuration enables rotation of the length adjuster 34 to selectively separate or bring together the center link 22 and tie rod 32 depending on the direction of rotation. This allows for quick and simple adjustments to the length of the steering mechanism assembly 20, thereby allowing the steering mechanism assembly 20 to be used with a range of vehicles. FIGS. 4-6 show the length adjuster 34 in various threaded positions within one of the center link bores 26.

Figure 2:
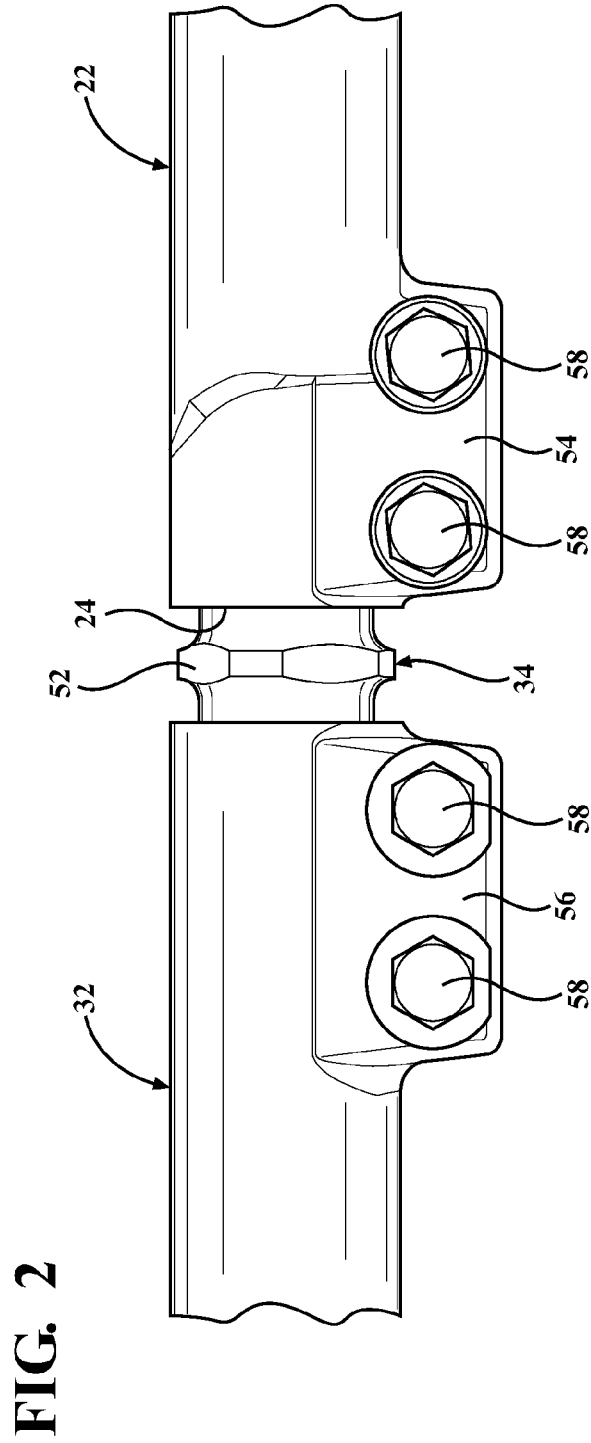
FIG. 2 is an enlarged fragmentary view showing an exemplary center link being joined to an exemplary tie rod through an exemplary length adjuster.

Referring back to FIGS. 2 and 3, once the length adjuster 34 is threaded to the proper location within the bore of the center link 22, a first clamping mechanism 54 is tightened to prevent unthreading of the length adjuster 34 from the center link 22. Specifically, the first clamping mechanism 54 is tightened around the overlapping unthreaded portion 30 of the center link 22 and the unthreaded middle section 50 of the length adjuster 34. Likewise, a second clamping mechanism 56 is tightened around the overlapping unthreaded portion 42 of the tie rod 32 and the unthreaded middle section 50 of the length adjuster 34. The engagement of the clamping mechanisms 54, 56 around the unthreaded areas of the center link 22, tie rod 32, and length adjuster 34 improves the life and durability of the steering mechanism 20 by reducing the exposure of the threads to bending or buckling loads. Rather, the bending and buckling loads are transmitted between the tie rod 32, length adjuster 34, and center link 22 through the unthreaded areas.

In the exemplary embodiment, the first clamping mechanism 54 is built into the center link 22, and the second clamping mechanism 56 is built into the tie rod 32. Bolts 58 are employed to tighten the clamping mechanisms 54, 56 around the length adjuster 34. In the exemplary embodiment, the clamping mechanisms 54, 56 each have a clam shell-like construction. However, it should be appreciated that a range of other configurations could alternately be employed. For example, the first and second clamping mechanisms could alternately be formed as separate pieces from the center link and tie rod.

Obviously, many modifications and variations of the present invention are possible in light of the above teachings and may be practiced otherwise than as specifically described while within the scope of the appended claims.

What is claimed is:

1. A steering mechanism for a vehicle, comprising:
    a center link extending between opposite longitudinal ends, each of said longitudinal ends having a center link bore with female threads that are spaced from said longitudinal ends by center link unthreaded portions;
    at least one tie rod with a tie rod end and a tie rod bore with female threads that are spaced from said tie rod end by a tie rod unthreaded portion;
    at least one length adjuster including first and second threaded sections with male threads and an unthreaded middle section;
    said first threaded section of said length adjuster being threadedly engaged with said center link bore of said center link with said center link unthreaded portion overlapping with said unthreaded middle section of said length adjuster, and said second unthreaded section of said length adjuster being threadedly engaged with said tie rod bore of said tie rod with said tie rod unthreaded portion overlapping with said unthreaded middle section of said length adjuster; and
    a first clamp being clamped at least partially about said overlapping center link unthreaded portion and said unthreaded middle section of said length adjuster and a second clamp being clamped at least partially about said overlapping tie rod unthreaded portion and said unthreaded middle section of said length adjuster.

2. The steering mechanism as set forth in claim 1 wherein said at least one tie rod is further defined as a pair of tie rods and wherein said at least one length adjuster is further defined as a pair of length adjusters.

3. The steering mechanism as set forth in claim 1 wherein said first clamp is formed integrally with said center link.

4. The steering mechanism as set forth in claim 1 wherein said second clamp is formed integrally with said tie rod.

5. The steering mechanism as set forth in claim 1 wherein said unthreaded middle section of said center link includes a tool engaging feature for rotating said length adjuster relative to said center link and to said tie rod to selectively separate or bring together said center link and said tie rod.

6. The steering mechanism as set forth in claim 1 wherein said male threads of said threaded first and second sections of said length adjuster extend in opposite rotational directions.

7. The steering mechanism as set forth in claim 6 wherein said female threads of said center link bore and said female threads of said tie rod bore extend in opposite rotational directions.

8. The steering mechanism as set forth in claim 1 wherein said first and second clamps are formed with a clamshell-like construction.

9. A steering mechanism, comprising:
- a center link which extends between opposite longitudinal ends, each of said longitudinal ends having a center link bore with threads that are spaced from the respective end by a center link unthreaded portion;
- at least one tie rod with a tie rod end having a tie rod bore with threads that are spaced from said tie rod end by tie rod unthreaded section;
- a length adjuster threadedly connecting one of said center link bores with said tie rod bore, said length adjuster including threaded sections and an unthreaded middle section;
- said unthreaded middle section of said length adjuster overlapping with said unthreaded portions of said center link bore and said tie rod bore; and
- a first clamp being clamped around said center link unthreaded section and said unthreaded middle section of said length adjuster, and a second clamp being clamped around said tie rod unthreaded section and said unthreaded middle section of said length adjuster.

10. The steering mechanism as set forth in claim 9 wherein said at least one tie rod is further defined as a pair of tie rods and wherein said at least one length adjuster is further defined as a pair of length adjusters.

11. The steering mechanism as set forth in claim 9 wherein said first clamp is formed integrally with said center link.

12. The steering mechanism as set forth in claim 9 wherein said second clamp is formed integrally with said tie rod.

13. The steering mechanism as set forth in claim 9 wherein said unthreaded middle section of said center link includes a tool engaging feature for rotating said length adjuster relative to said center link and to said tie rod to selectively separate or bring together said center link and said tie rod.

14. The steering mechanism as set forth in claim 9 wherein said threaded sections of said length adjuster have male threads that extend in opposite rotational directions.

15. The steering mechanism as set forth in claim 14 wherein threads of said center link bore and said tie rod bore extend in opposite rotational directions.

* * * * *